US008346851B2

(12) United States Patent
Little (10) Patent No.: US 8,346,851 B2
(45) Date of Patent: Jan. 1, 2013

(54) SYSTEM AND METHOD FOR DETERMINING WHEN TO GENERATE SUBORDINATE COORDINATORS ON LOCAL MACHINES

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 632 days.

(21) Appl. No.: 12/551,454

(22) Filed: Aug. 31, 2009

(65) Prior Publication Data

US 2011/0055313 A1     Mar. 3, 2011

(51) Int. Cl.
*G06F 15/16* (2006.01)
(52) U.S. Cl. ......... 709/203; 709/201; 709/217; 709/219
(58) Field of Classification Search .......... 709/201–203, 709/217–219
See application file for complete search history.

(56) References Cited

U.S. PATENT DOCUMENTS

| | | | | |
|---|---|---|---|---|
| 6,038,589 A | * | 3/2000 | Holdsworth et al. | ......... 709/201 |
| 6,438,582 B1 | * | 8/2002 | Hsiao et al. | .................. 709/201 |
| 6,457,041 B1 | * | 9/2002 | Hutchison | ..................... 709/203 |
| 6,499,063 B1 | * | 12/2002 | Chessell et al. | ............... 709/201 |
| 6,542,922 B1 | * | 4/2003 | Chessell et al. | ............... 709/203 |

OTHER PUBLICATIONS

"JBoss Transactions 4.2.3, JTS Programmers Guide", © 2006, 117 pages.
Johnson, Rod, et al., "Spring java/j2ee Application Framework, The Spring Framework—Reference Documentation", Version 2.5.6, © 2004-2008, 590 pages.

* cited by examiner

*Primary Examiner* — Bharat N Barot
(74) *Attorney, Agent, or Firm* — Lowenstein Sandler PC (57) ABSTRACT

A local machine receives a service request from a parent transaction coordinator hosted by a remote machine, the service request including a transaction context. The transaction context is cached at the local machine. Processing logic on the local machine monitors a service as the service performs work to comply with the service request. Processing logic determines when to generate a subordinate transaction coordinator and when to register the subordinate transaction coordinator with the parent transaction coordinator based on the work performed by the monitored device.

20 Claims, 6 Drawing Sheets

SYSTEM AND METHOD FOR DETERMINING WHEN TO GENERATE SUBORDINATE COORDINATORS ON LOCAL MACHINES

TECHNICAL FIELD

Embodiments of the present invention relate to distributed transactions, and more specifically to improving efficiency of distributed transactions.

BACKGROUND

Distributed transactions are often performed on distributed computing systems. A distributed transaction is a set of operations that update shared objects. Distributed transactions must satisfy the properties of Atomicity, Consistency, Isolation and Durability, known commonly as the ACID properties. According to the Atomicity property, either the transaction successfully executes to completion, and the effects of all operations are recorded, or the transaction fails. The Consistency property requires that the transaction does not violate integrity constraints of the shared objects. The Isolation property requires that intermediate effects of the transaction are not detectable to concurrent transactions. Finally, the Durability property requires that changes to shared objects due to the transaction are permanent.

In some distributed transaction systems, a single transaction coordinator directly manages all participants in the transaction. Therefore, each transaction participant, regardless of whether it operates on the same machine as the transaction coordinator or a remote machine, registers with the transaction coordinator and exchanges messages with the transaction coordinator. This can cause significant overhead due to a high volume of cross-machine interactions (e.g., remote invocations of the participants), and can slow down transactions and increase resource utilization.

In other distributed transaction systems, upon a remote machine receiving instructions for a service/resource on the remote machine to perform an action associated with a transaction managed by a parent coordinator, the remote machine immediately generates a subordinate coordinator and registers the subordinate coordinator with the parent coordinator. This is performed before any business logic is executed (e.g., before the services or other resources perform any actions associated with the transaction). Once the subordinate coordinator is registered with the parent coordinator, the subordinate coordinator must participate in a two-phase commit protocol managed by the parent coordinator, which may cause unnecessary cross-machine interactions.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for performing distributed transactions. In one embodiment, a local machine receives a service request from a parent transaction coordinator hosted by a remote machine, the service request including a transaction context. The transaction context is cached at the local machine. Processing logic on the local machine monitors a service as the service performs work to comply with the service request. The processing logic can determine when to generate a subordinate coordinator and when to register the subordinate coordinator with the parent coordinator based on the work performed by the monitored service.

In one embodiment, if the service performs transactional work, a subordinate transaction coordinator is generated at the local machine, and the service is registered with the subordinate transaction coordinator. If the transactional work performed by the service changes a state of the service, the subordinate transaction coordinator is registered with the parent transaction coordinator using the transaction context. In one embodiment, information for registering the subordinate coordinator with the parent coordinator is attached to a service response (e.g., business logic response) generated by the service. Thus, the subordinate coordinator may register with the parent coordinator only when necessary, reducing cross machine traffic. Moreover, when it is determined that the subordinate coordinator should be registered with the parent coordinator, the information for registering the subordinate coordinator with the parent coordinator and the service response may be sent in a single message, further reducing cross-machine traffic.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "caching", "receiving", "monitoring", "generating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
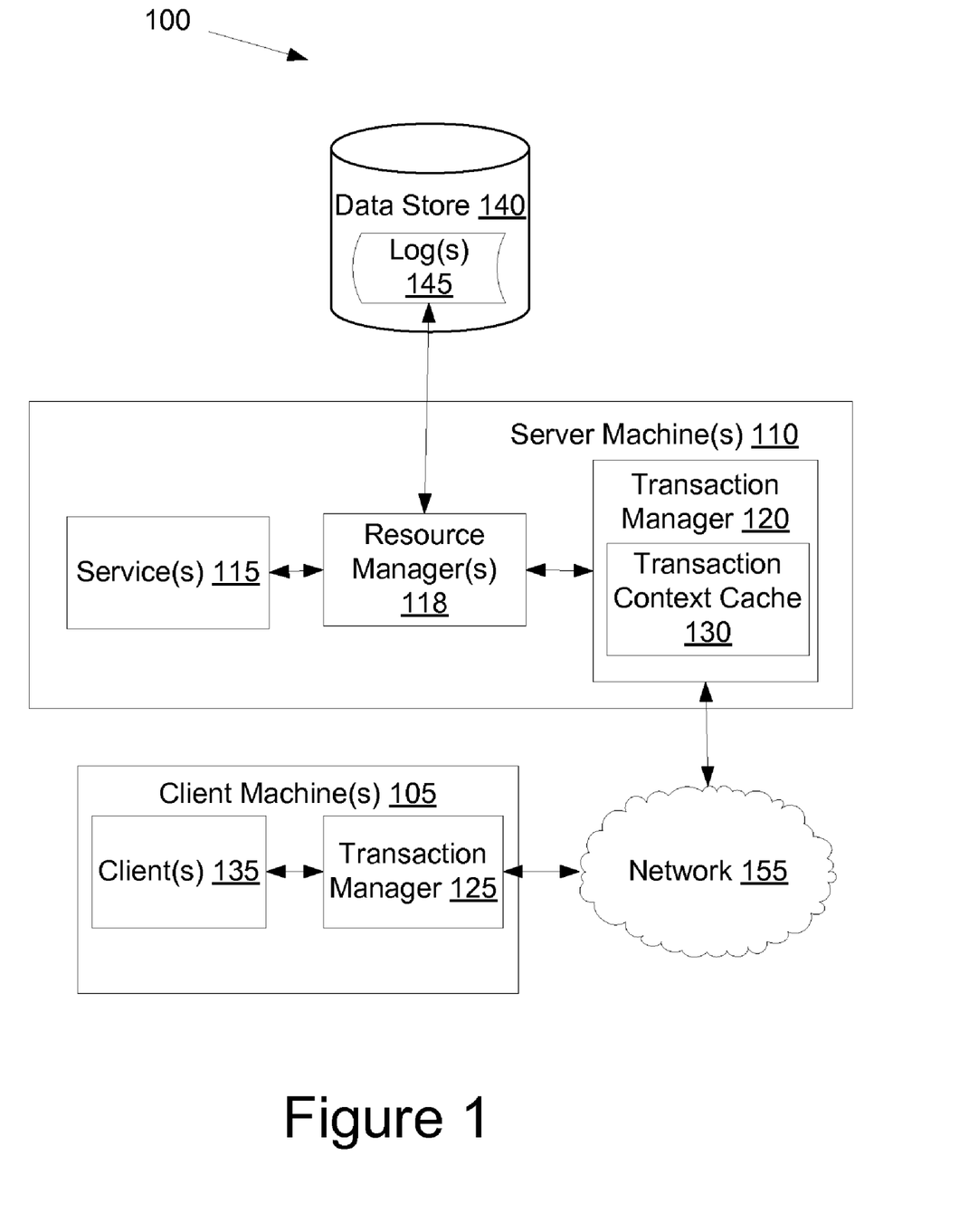
FIG. 1 illustrates an exemplary distributed computing system, in which embodiments of the present invention may operate.

FIG. 1 illustrates an exemplary distributed computing system 100, in which embodiments of the present invention may operate. The distributed computing system 100 may include a service oriented architecture (SOA) (an information system architecture that organizes and uses distributed capabilities (services) for one or more applications). An SOA provides a uniform means to offer, discover, interact with and use capabilities (services) distributed over a network. Through the SOA, applications may be designed that combine loosely coupled and interoperable services.

In one embodiment, the distributed computing system 100 includes a middleware service that facilitates communication between services, clients, and additional applications or processes. Examples of middleware services include a remote procedure call (RPC), a message oriented middleware (MOM), an object request broker (ORB), and an enterprise service bus (ESB). An ESB is an event-driven and standards-based messaging engine that provides services for more complex architectures. The ESB provides an infrastructure that links together services and clients to enable distributed applications and processes. The ESB may be implemented to facilitate an SOA. In one embodiment, the ESB is a single bus that logically interconnects all available services and clients. Alternatively, the ESB may include multiple busses, each of which may logically interconnect different services and/or clients.

The distributed computing system 100 includes one or more client machines 105 connected with one or more server machines 110 via a network 155. The network 155 may be a private network (e.g., local area network (LAN), wide area network (WAN), intranet, etc.), a public network (e.g., the Internet), or a combination thereof.

Client machines 105 may be, for example, personal computers (PC), palm-sized computing devices, personal digital assistants (PDA), etc. Each client machine 105 may host one or more clients 135. Client(s) 135 may be applications run on a PC, server, database, etc. In an SOA, client(s) 135 include applications that access services. Client(s) 135 may be fat clients (client that performs local processing and data storage), thins client (client that performs minimal or no local processing and minimal to no data storage), and/or hybrid clients (client that performs local processing but little to no data storage).

Server machines 110 host services 115, applications and/or other functionality that is available to clients 135 on the distributed computing system 100. Each server machine 110 may be a single machine, or may include multiple interconnected machines (e.g., machines configured in a cluster).

Services 115 may be discretely defined sets of contiguous and autonomous functionality (e.g., business functionality, technical functionality, etc.). Each service 115 may represent a process, activity or other resource (referred to herein as "business logic") that can be accessed and used by other services or clients on network 155. Each service 115 may be independent of other services 115, and may be accessed without knowledge of its underlying platform implementation. Services 115 may execute their business logic in response to receiving service requests from other services and/or from clients 135. Upon completion of the business logic execution, the service generates a service response that includes a result of the execution.

In an example for a business function of "managing orders," services may include, for example, create order, fulfill order, ship order, invoice order, cancel/update order, etc. Each such service may be autonomous from the other services that are used to manage orders, and may be remote from one another and have different platform implementations. However, the services may be combined and used by one or more applications to manage orders.

In one embodiment, each service 115 is managed by a resource manager 118. A resource manager 118 is a software module that interfaces a service 115 or other application with a transaction manager 120 and/or with a transaction coordinator initiated by transaction manager 120. The resource manager 118 may request that a transaction be started for a managed service, may enlist a managed service in a transaction, and may commit the service to the transaction. A resource manager 118 may also manage a persistent and stable storage system. In one embodiment, a resource manager 118 monitors a service 115 to identify whether the service has performed or will perform transactional work. Upon a determination that the service will perform or has performed transactional work, resource manager 118 may request that the service be added as a participant to a transaction.

In one embodiment, each service 115 is connected with a resource manager 118 (as shown). Resource managers 118 may be configured to manage only a single service, or to manage multiple services. In another embodiment, one or more services 115 include a resource manager.

In one embodiment, server machine 110 is coupled with a data store 140. Data store 140 may include a file system, a database, or other data storage arrangement. In one embodiment, data store 140 is internal to server machine 110. Alternatively, data store 140 may be external to server machine 110, and connected with server machine 110 either directly or via a network. In one embodiment, each resource manager 118 maintains a log 145 on data store 140 for a managed service 115. The log 145 may be an undo log (log of committed changes that occur during a distributed transaction) and/or a redo log (log of uncommitted changes that occur during a distributed transaction). The redo log and/or undo log can be used to rollback any changes that occurred during a distributed transaction if the transaction is aborted.

In one embodiment, each client machine 105 includes a transaction manager 125 and each server machine 110 includes a transaction manager 120. A transaction manager is a software module that generates distributed transactions and generates transaction coordinators for coordinating multiple participants during the transactions. The following description includes multiple references to generating transaction coordinators. It should be understood that whenever a transaction coordinator is generated, a transaction is also generated to be managed by the transaction coordinator.

A participant of a transaction may be another transaction manager, a local resource manager, a local service, etc. Coordinating a distributed transaction includes determining whether each participant can commit to a transaction, directing each participant to commit if all are able, and directing each participant to rollback if not all participants are able to commit. A transaction coordinator must arrive at a commit or abort decision and propagate that decision to all participants that it manages.

Transaction managers may generate coordinators that act as parent coordinators (transaction coordinators that manage other transaction coordinators) and that act as subordinate coordinators (transaction coordinators that are managed by a parent transaction coordinator). A single coordinator may be subordinate to one coordinator and a parent to one or more additional coordinators. A coordinator may become subordinate to another coordinator through interposition. Interposition is performed by registering the subordinate coordinator as a participant of a transaction managed by the parent coordinator. Once interposition is performed, from the point of view of the parent coordinator, the subordinate coordinator may be no different from other participants of the transaction.

In one embodiment, transaction manager 125 generates a master transaction coordinator. A master transaction coordinator is a parent transaction coordinator that is not subordinate to any other transaction coordinators. The master transaction coordinator acts on behalf of a process (e.g., a client 135) that initiates a distributed transaction to coordinate all participants of the distributed transaction. In one embodiment, the master transaction coordinator is configured to initiate a two phase commit distributed transaction if there are multiple resource managers, services, transaction coordinators, etc. that have registered as participants in the transaction.

In one embodiment, transaction manager 120 generates a subordinate transaction coordinator for coordinating a local transaction between services located on the same server machine 110 as the transaction manager 120. The transaction manager 120 may gather information about the services with which it is co-located. When it is determined that one or more of the services have performed or will perform transactional work, transaction manager 120 may then generate the subordinate coordinator. When the transaction manager 120, resource manager 118 and/or subordinate coordinator generated by the transaction manager 120 determines that one or more of the services has performed or will perform transactional work that will change a working state of the service, the subordinate transaction coordinator registers with the parent (e.g., master) transaction coordinator. The subordinate transaction coordinator may then receive prepare, commit and/or abort messages from a parent transaction coordinator, and propagate the messages to participants that it manages.

Conventional transaction managers generate a subordinate coordinator immediately upon receiving a transaction context from a remote parent coordinator, and always register the subordinate coordinator with the parent coordinator. In one embodiment of the present invention, however, the transaction manager 120 does not generate a subordinate coordinator upon receiving a service request that is accompanied by a transaction context. Instead, the transaction manager 120 may store the transaction context in a transaction context cache 130, or in a table, list or other data structure. Alternatively, the transaction context may be stored in the cache by a transaction dispatcher (not shown) that communicates with the transaction coordinator 120. The transaction manager 120 may then forward the service request on to the service 115 without first generating the subordinate coordinator. The transaction manager 120 or the resource manager 118 associated with the service 115 may then monitor the service 115. When the service 115 is detected to perform transactional work, then transaction manager 120 may initiate a subordinate transaction coordinator and register the service with the subordinate transaction coordinator. In one embodiment, the service is registered with the transaction coordinator by registering the resource manager associated with the service to the transaction coordinator. If the service is detected to perform transactional work that changes a state of the service, then the generated subordinate coordinator is registered with a parent coordinator on the client machine 105.

During a prepare phase of a two-phase commit distributed transaction, a master transaction coordinator sends a query to each registered participant asking whether the participant can commit to the transaction. However, any subordinate coordinator that did not register with the master coordinator (or with another parent coordinator that is registered with the master coordinator) will not participate in the two phase commit distributed transaction. Thus, in one embodiment, unnecessary prepare messages sent to remote participants that do not perform transactional work, or that just perform read-only work, are reduced or eliminated.

Figure 2:
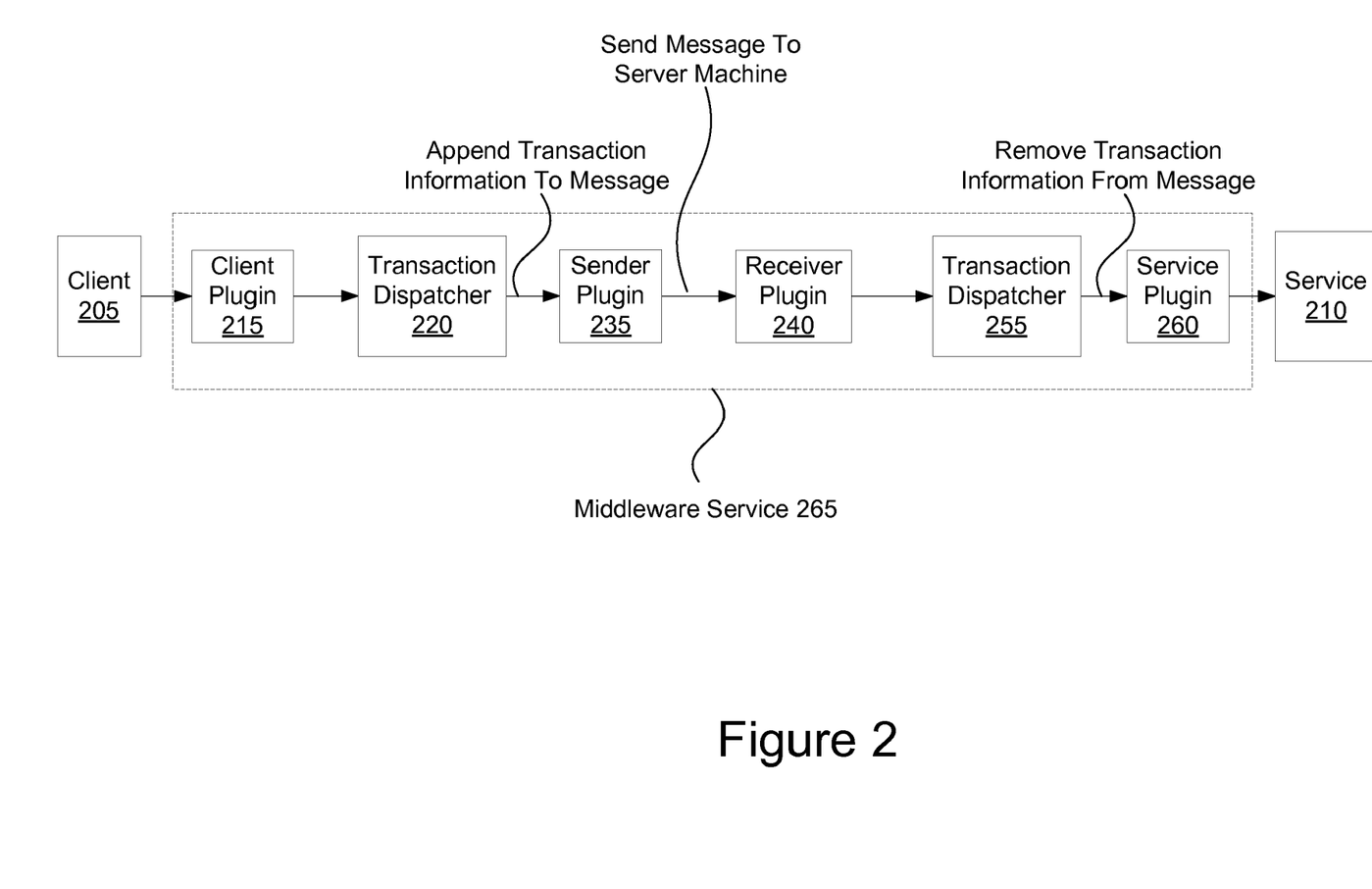
FIG. 2 is a data flow diagram illustrating a message flowing through a distributed computing system via a middleware service, in accordance with one embodiment of the present invention.

FIG. 2 is a data flow diagram illustrating a message flowing through a middleware service (e.g., an ESB, MOM, ORB, etc.), in accordance with one embodiment of the present invention. In one embodiment, a client 205 requests that multiple operations be performed transactionally. In response, a transaction is started, and a transaction coordinator is generated to manage the transaction. Service requests are generated for each of the services that will participate in the transaction. Each service request is addressed to a service 210 that will perform operations to satisfy the request.

In one embodiment, for at least one of the service requests, client 205 provides the service request to the middleware service 265 by sending the message to client plugin 215. The client plugin 215 operates as an interface between the client 205 and the middleware service 265.

Transaction dispatcher 220 appends transaction context information associated with the transaction managed by the transaction coordinator to the message, and sends the message to sender plugin 235. The transaction context information may include a transaction ID for the transaction, and address of the transaction coordinator, a date and time that the transaction began, an associated timeout time, and/or additional information. Sender plugin 235 is a dispatcher that directs the message to the service 210.

In one embodiment, each of client plugin 215, transaction dispatcher 220, and sender plugin 235 are collocated with client 205. Thereby, these dispatchers and plugins may occupy the same address space (e.g., share the same java virtual machine) as the client 205 for maximum efficiency and minimum overhead. In another embodiment, one or more of the dispatchers and plugins may be external to client 205.

Receiver plugin 240 is a dispatcher that receives the message directed to service 210, and passes on the message to transaction dispatcher 255. Transaction dispatcher 255 removes transaction context information from the message and sends the message to service plugin 260. In one embodiment, transaction dispatcher 255 caches the transaction context in a transaction context cache. Alternatively, transaction dispatcher 255 may place the transaction context in a data structure such as a table, list, etc. Transaction dispatcher 255 may later provide the transaction context to a transaction coordinator. Service plugin 260 delivers the service request to service 210. Service 210 may then take appropriate action based on the body of the service request.

In one embodiment, each of service plugin 260, transaction dispatcher 255, and receiver plugin 240 are collocated with service 210. Thereby, these dispatchers and plugins may occupy the same address space as the service 210 for maximum efficiency and minimum overhead. In another embodiment, one or more of the dispatchers and plugins may be external to service 210.

Figure 3:
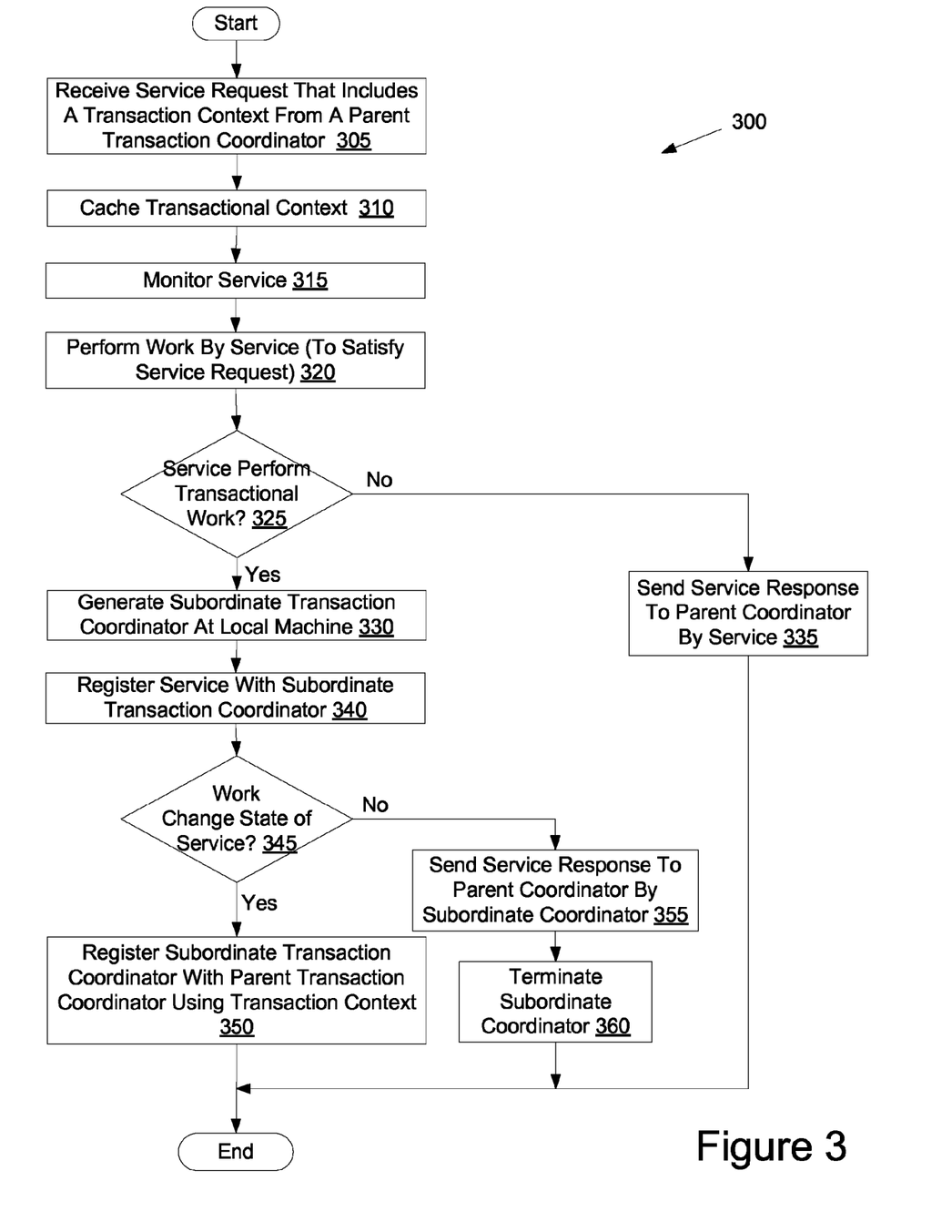
FIG. 3 illustrates a flow diagram of one embodiment for a method of optimizing a distributed transaction.

FIG. 3 illustrates a flow diagram of one embodiment for a method 300 of optimizing a distributed transaction. The method is performed by processing logic that comprises hardware (e.g., circuitry, dedicated logic, programmable logic, microcode, etc.), software (such as instructions run on a processing device), or a combination thereof. In one embodiment, method 300 is performed by transaction manager 120 of FIG. 1.

Referring to FIG. 3, at block 305 of method 300 a transaction manager receives a service request that includes a transaction context from a parent transaction coordinator. At block 310, the transaction context is removed from the service request and cached. The transaction context may be removed by the transaction manager or by a transaction dispatcher. The service is then sent on to the service for the service to satisfy the request.

At block 315, the service is monitored. The service may be monitored by the transaction manager, or buy a resource manager that manages the service. At block 320, the service performs work to satisfy the service request. The service may expressly request that its work be performed transactionally. Alternatively, the transaction manager and/or resource manager may identify whether any work performed by the service is transactional work. Transactional work includes both work that requires a state of the service to be read and work that causes the state of the service to be changed.

In one embodiment, the transaction manager or resource manager identify when the service requests read locks and write locks on data, when the service opens a database connection, and/or when the service performs other actions indicative of transactional work. When any action indicative of transactional work is performed by a service (e.g., when a read lock or write lock is requested), it may be determined that the service is (or will be) performing transactional work. In one embodiment, the resource manager associated with the service is a read only resource manager (a resource manager the guarantees that the service will only ever do read only work). If the resource manager is a read only resource manager, transaction manager may determine that the service will be performing read only transactional work before the work has begun.

At block 325, processing logic determines whether the service has performed any transactional work. In one embodiment, the service makes an explicit call to join or start a transaction. In another embodiment, the service requests read locks and/or write locks, each of which are indicative of transactional work. If the service does perform any transactional work, the method continues to block 330. If the service fails to perform any transactional work, the method continues to block 335.

At block 335, the service sends the service response to the parent coordinator. Since the service did not perform any transactional work, no transaction coordinator was generated, and the service sends the service response to the parent coordinator directly.

At block 330, processing logic generates a subordinate transaction coordinator at a local machine. At block 340, the processing logic registers the service with the subordinate transaction coordinator (e.g., using an add participant command). In one embodiment, as long as all participants are read only and/or do not perform transactional work, the subordinate transaction coordinator will not register with the parent coordinator. Therefore, any work performed by the service will be associated with a local transaction. Since the subordinate transaction coordinator is not registered with the parent transaction coordinator, the local transaction is not associated with the transaction managed by the parent coordinator.

At block 345, processing logic determines whether the work has changed a state of the service (e.g., if a write has been performed to change a working state of the service). If the work has not changed the state of the service (e.g., if only reads were performed), the method continues to block 355. If the work has changed the state of the service (e.g., if writes were performed), the method proceeds to block 350.

At block 350, the subordinate transaction coordinator is registered with the parent transaction coordinator using the cached transaction context. In one embodiment, the subordinate transaction coordinator requests the transaction context from the transaction dispatcher or transaction manager. Alternatively, the subordinate transaction coordinator may retrieve the context information directly from the cache. At any given time, there may be multiple transaction contexts stored in the cache. In one embodiment, each transaction context is associated with one or more services that received service requests to which the transaction contexts had originally been attached. In one embodiment, the cache is searched for a transaction context that is associated with the service that has performed or will perform the transactional work.

The subordinate transaction coordinator may be registered with the parent transaction coordinator shortly after the service request was received, or seconds or minutes after it was received. Once the subordinate coordinator registers with the parent coordinator, the local transaction becomes associated with (and subordinate to) the transaction managed by the parent transaction coordinator.

At block 355, the service response is sent to the parent coordinator by the subordinate coordinator. The subordinate coordinator may then be terminated at block 360 if the service (business logic) has completed its work. In one embodiment, the subordinate coordinator is terminated prior to the parent transaction coordinator initiating a commit protocol (e.g., a two-phase commit protocol). The method then ends.

Figure 4:
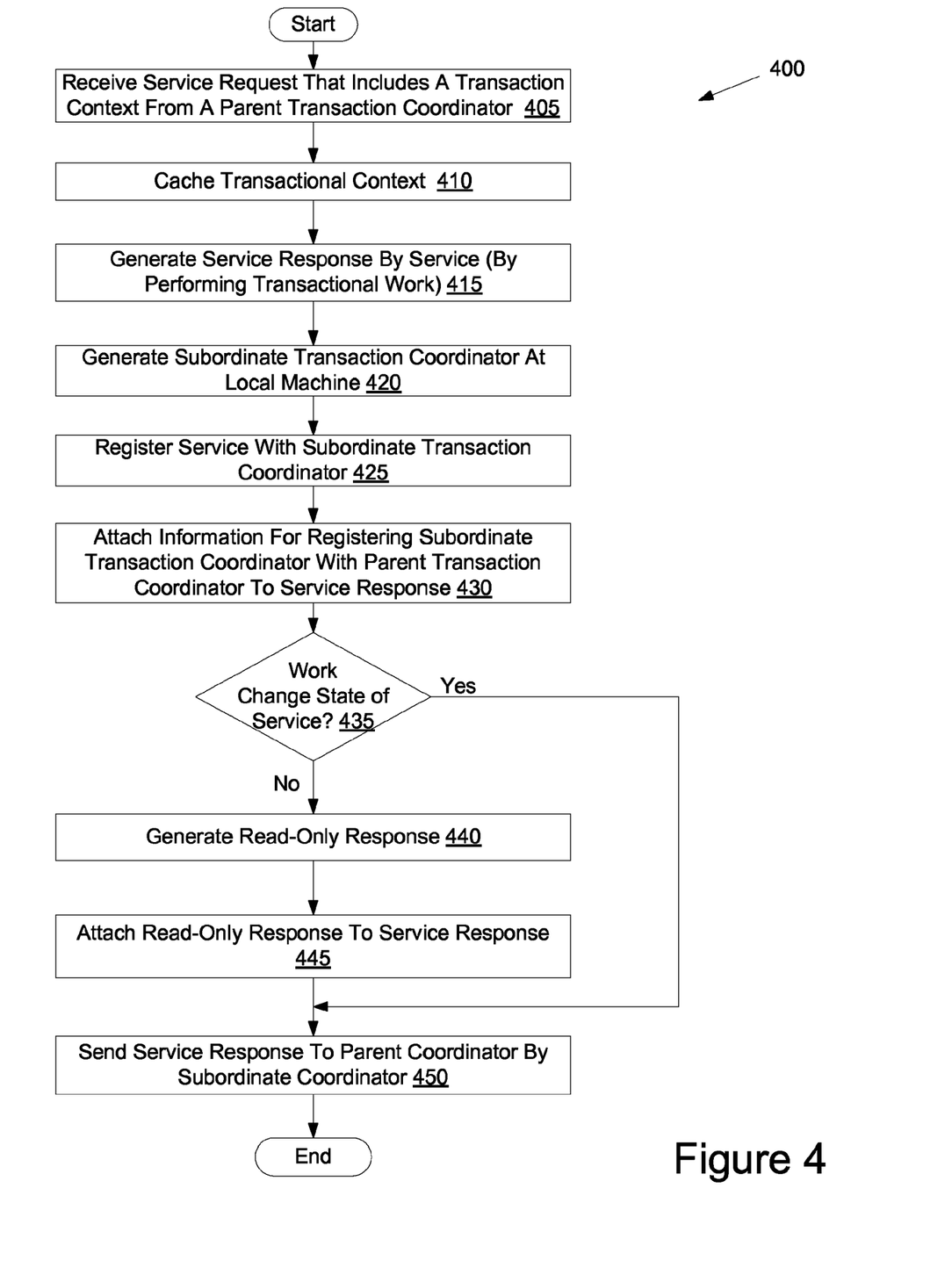
FIG. 4 illustrates a flow diagram of another embodiment for a method of optimizing a distributed transaction.

FIG. 4 illustrates a flow diagram of one embodiment for a method 400 of optimizing a distributed transaction. The method is performed by processing logic that comprises hardware (e.g., circuitry, dedicated logic, programmable logic, microcode, etc.), software (such as instructions run on a processing device), or a combination thereof. In one embodiment, method 400 is performed by transaction manager 120 of FIG. 1.

Referring to FIG. 4, at block 405 of method 400 a transaction manager receives a service request that includes a transaction context from a parent transaction coordinator. At block 410, the transaction context is removed from the service request and cached. The service is then sent on to the service for the service to satisfy the request. At block 415, the service generates a service response by performing transactional work.

At block 420, processing logic generates a subordinate transaction coordinator at a local machine. At block 425, the processing logic registers the service with the subordinate transaction coordinator.

At block 430, processing logic attaches information for registering the subordinate transaction coordinator with the parent transaction coordinator to the service response.

At block 435, processing logic determines whether the work performed by the service changed a state of the service. If the work did change a state of the service, the method proceeds to block 450. If the work did not change a state of the service, the method continues to block 440.

In one embodiment, at block 440, processing logic generates a read-only response. The read-only response is a heuristically generated commit decision that is made in the absence of receiving a prepare message. That is, the read-only response is unilaterally made by the subordinate coordinator without waiting for a consensus commit or abort decision from the parent transaction coordinator. Alternatively, the subordinate transaction coordinator may heuristically generate a commit message. If none of the services managed by the subordinate transaction coordinator have changed states as a consequence of the transaction, then it is irrelevant to those services whether or not the transaction ultimately commits. Therefore, the heuristic read-only or commit messages may be safely generated.

At block 445, the read-only response (or commit message) are attached to the service response. At block 450, the service response is sent to the parent coordinator by the subordinate coordinator. The parent coordinator may then remove the commit or read-only response and/or the information for registering the subordinate coordinator with the parent coordinator. The parent coordinator uses the information to perform interposition locally by registering the subordinate coordinator with itself. In one embodiment, the registration is performed via an add participant command. Once the parent coordinator initiates a two-phase commit protocol, it may use the read-only or commit response without sending a prepare message to the subordinate coordinator. Thus, fewer messages are transmitted between the subordinate coordinator and the parent coordinator than in conventional transaction systems.

Figure 5:
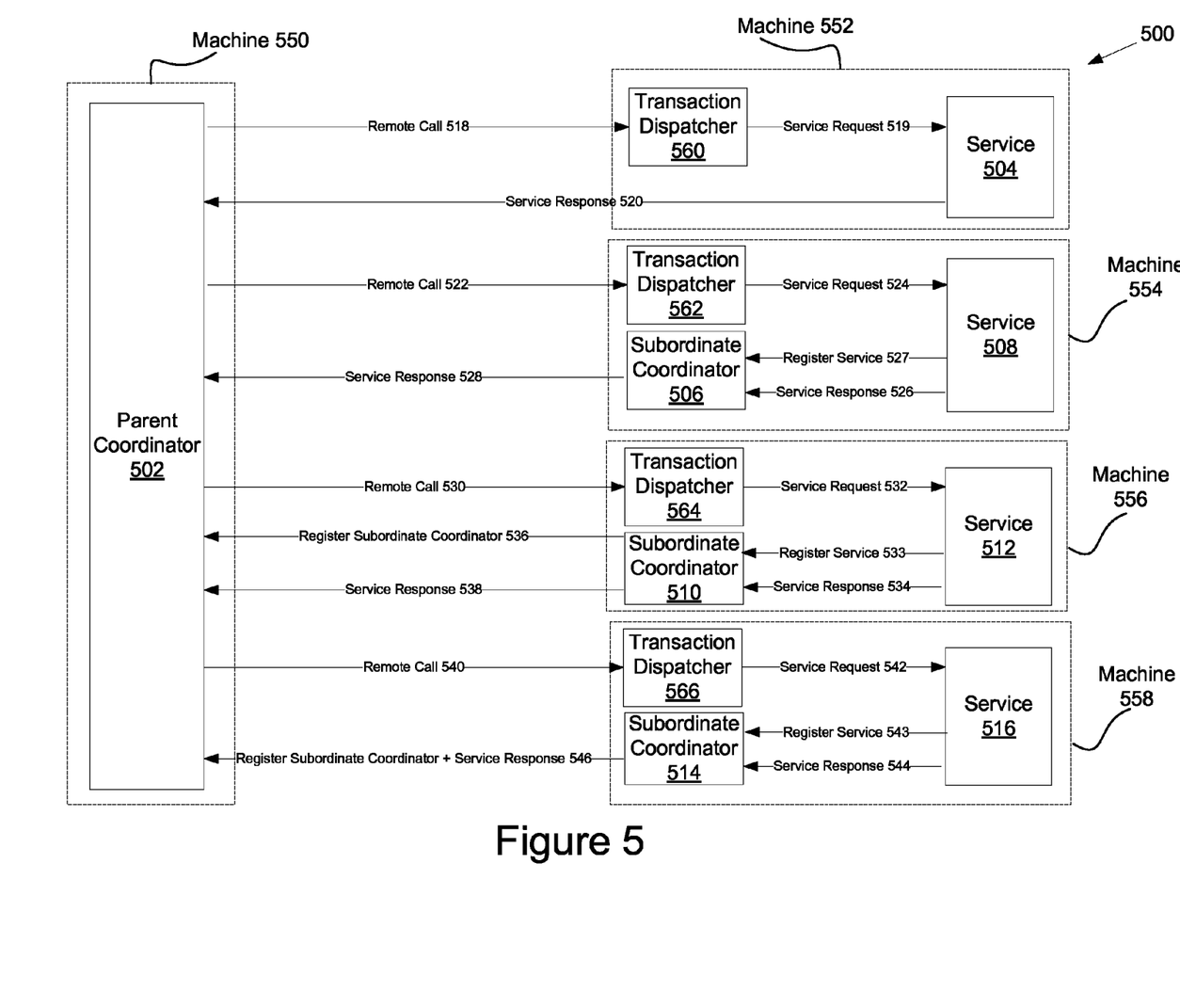
FIG. 5 is a transaction diagram illustrating messages flowing through a distributed computing system, in accordance with one embodiment of the present invention.

FIG. 5 is a transaction diagram illustrating messages flowing through a distributed computing system 500, in accordance with one embodiment of the present invention. In one embodiment, the distributed computing system 500 includes multiple machines 550, 554, 556, and 558, each of which may be a personal computer, mainframe, server computer, etc. Machine 550 includes a parent coordinator 502. Note that machine 550 may also include a transaction dispatcher (not shown), which may add and remove transaction context information as messages are sent and received. Machine 552 includes transaction dispatcher 560 and service 504. Machine 554 includes transaction dispatcher 562, service 508 and subordinate coordinator 506. Machine 556 includes transaction dispatcher 564, service 512 and subordinate coordinator 510. Machine 558 includes transaction dispatcher 566, service 516 and subordinate coordinator 514. Each of services 504, 508, 512 and 516 may be managed by a resource manager (not shown).

In one embodiment, parent coordinator 502 is initiated by a transaction manager (not shown) running on machine 550. Parent coordinator 502 may be initiated in response to a request for transactional work that is received from a client (not shown), which may also be running on machine 550. Once initiated, parent coordinator 502 coordinates a transaction.

In the illustrated embodiment, the client has requested a transaction for which services 504, 508, 512 and 516 will perform work. Parent coordinator 502 sends remote calls 518, 522, 530, 540 to machines 552, 554, 556 and 558, respectively. Each remote call includes a service request directed to a particular service. Each remote call further includes transaction context information of the transaction managed by parent coordinator 502.

Machine 552 receives remote call 518. Transaction dispatcher 560 removes the transaction context information from the remote call 518, and sends the service request 519 on to service 504. Service 504 generates a service response 520 to the service request included in the remote call, and sends it back to parent coordinator 502.

Service 504 does not perform any transactional work. Accordingly, machine 552 does not generate any subordinate coordinator, freeing up resources of machine 552. Additionally, no message is sent from machine 552 to machine 550 for registering a subordinate coordinator with the parent coordinator 502, thus reducing cross-machine traffic as compared to traditional interposition implementations.

Machine 554 receives remote call 522. Transaction dispatcher 562 removes and caches the transaction context information from the remote call 522, and sends the service request 524 on to service 508. Service 508 performs transactional work. Accordingly, machine 554 generates subordinate coordinator 506 for managing a local transaction of which service 508 is a participant. Service 508 registers with the subordinate coordinator 506 to become a participant of the local transaction. Upon completing the work requested by the service request 524, service 508 generates a service response 526 and sends it to subordinate coordinator 506. Subordinate coordinator then sends the service response 528 on to parent coordinator 502.

None of the transactional work performed by service 508 modifies a state of the service 508. Accordingly, it is immaterial to service 508 whether the transaction commits or aborts. Thus, subordinate coordinator 506 does not register with parent coordinator 502, reducing cross-machine traffic.

Machine 556 receives remote call 530. Transaction dispatcher 564 removes and caches the transaction context information from the remote call 530, and sends the service request 532 on to service 512. Service 512 performs transactional work. Accordingly, machine 556 generates subordinate coordinator 510 for managing a local transaction of which service 512 is a participant. Service 512 registers 533 with the subordinate coordinator 510 to become a participant of the local transaction.

Service 512 performs work that modifies a state of the service 512. Accordingly, subordinate coordinator 510 retrieves the cached transaction context and uses it to send a message 536 to parent coordinator 502 registering subordinate coordinator 510 with the parent coordinator 502. Thus, the local transaction becomes associated with the transaction managed by parent coordinator 502. Upon completing the work requested by the service request 532, service 512 generates a service response 534 and sends it to subordinate coordinator 510. Subordinate coordinator 510 then sends the service response 538 on to parent coordinator 502.

Machine 558 receives remote call 540. Transaction dispatcher 566 removes and caches the transaction context information from the remote call 540, and sends the service request 542 on to service 516. Service 516 performs transactional work. Accordingly, machine 558 generates subordinate coordinator 514 for managing a local transaction of which service 516 is a participant. Service 516 registers 543 with the subordinate coordinator 514 to become a participant of the local transaction. Upon completing the work requested by the service request 542, service 516 generates a service response 544 and sends it to subordinate coordinator 514.

Service 516 performs work that modifies a state of the service 516. Accordingly, subordinate coordinator 514 retrieves the cached transaction context and generates information for registering subordinate coordinator 514 with the parent coordinator 502. Subordinate coordinator 514 appends the information for registering itself with the parent coordinator 502 to the received service response. The service response is then sent along with the information for registering the subordinate coordinator with the parent coordinator 546 to the parent coordinator 502. By sending the registration information and the service response in a single message, cross-machine traffic is reduced.

Figure 6:
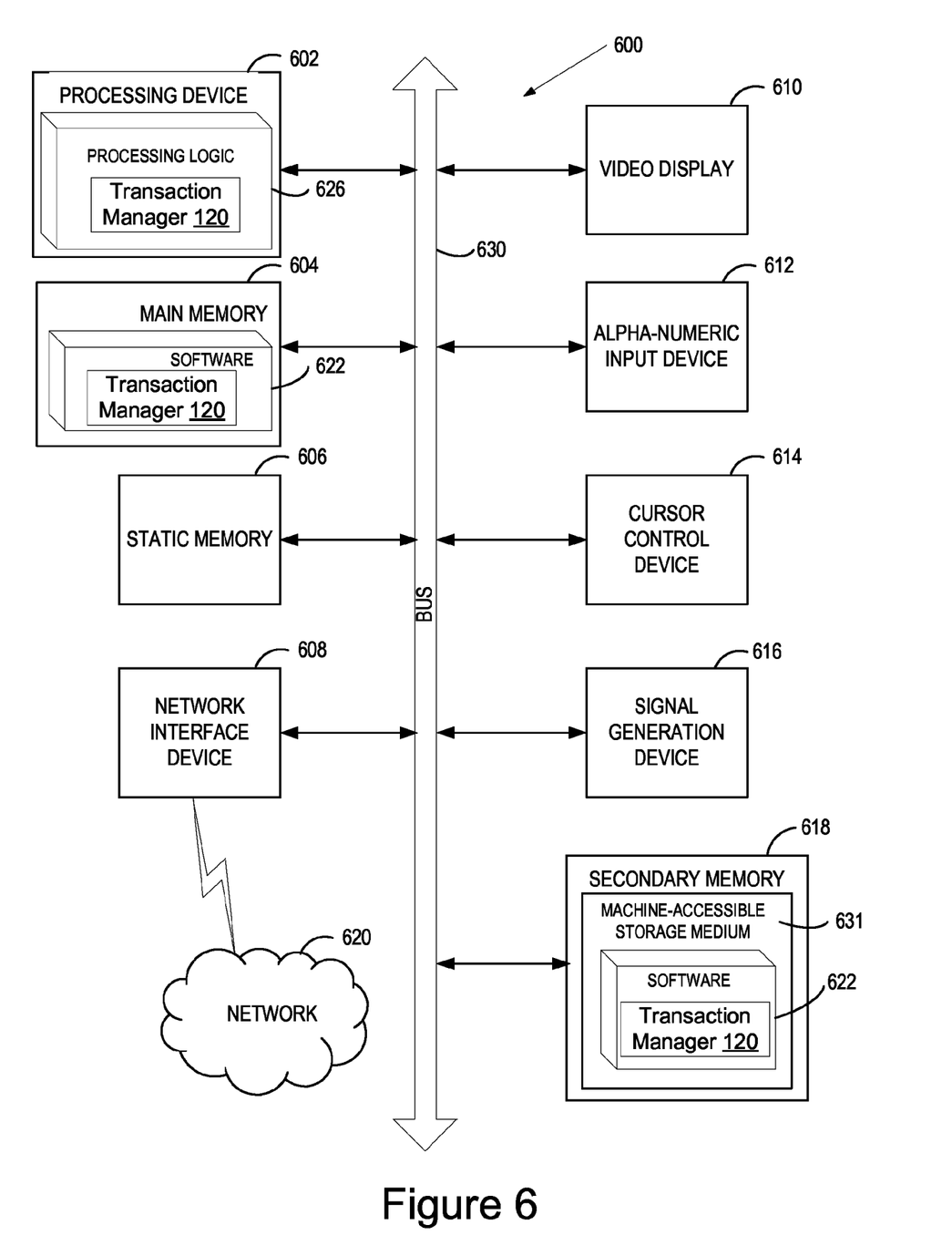
FIG. 6 illustrates a block diagram of an exemplary computer system, in accordance with one embodiment of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-readable storage medium (or more specifically a computer-readable storage medium) 631 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-readable storage media. The software 622 may further be transmitted or received over a network 620 via the network interface device 608.

The machine-readable storage medium 631 may also be used to store a transaction manager 120, resource manager 118 and/or transaction dispatcher 255 and/or a software library containing methods that call a transaction manager 120, resource manager 118 and/or transaction dispatcher 255. While the machine-readable storage medium 631 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer implemented method of performing a distributed transaction, comprising:
   receiving, at a local machine running a transaction manager, a service request from a parent transaction coordinator hosted by a remote machine, the service request including a transaction context;
   caching the transaction context at the local machine;
   monitoring, by the local machine, a service as the service performs work to comply with the service request; and
   determining, by the local machine after the service has begun performing the work, when to generate a subordinate transaction coordinator and when to register the subordinate transaction coordinator with the parent transaction coordinator based on the work performed by the monitored service.

2. The method of claim 1, further comprising:
   generating the subordinate transaction coordinator at the local machine and registering the service with the subordinate transaction coordinator when the service performs transactional work.

3. The method of claim 2, further comprising:
   if the transactional work changes a state of the service, registering the subordinate transaction coordinator with the parent transaction coordinator using the transaction context.

4. The method of claim 3, wherein the service performs transactional work, the method further comprising:
   generating a service response to the service request by the service;
   attaching information for registering the subordinate transaction coordinator with the parent transaction coordinator to the service response; and
   sending the service response to the parent transaction coordinator, wherein the parent transaction coordinator to use the attached information to register the subordinate transaction coordinator with the parent transaction coordinator.

5. The method of claim 2, wherein the service performs transactional work that fails to change a state of the service, the method further comprising:
   generating a service response to the service request by the service;
   sending the service response to the parent transaction coordinator by the subordinate transaction coordinator; and
   terminating the subordinate transaction coordinator prior to an initiation of a commit protocol by the parent transaction coordinator.

6. The method of claim 5, wherein the transactional work performed by the service does not change a state of the service, the method further comprising:
   generating a read-only response to a prepare message prior to the prepare message being generated by the parent transaction coordinator; and
   attaching the read-only response to the service response, wherein the parent transaction coordinator to use the read-only response during a commit phase of a two-phase commit protocol without sending the prepare message to the subordinate transaction coordinator.

7. The method of claim 1, wherein the service does not perform transactional work, the method further comprising:
   generating a response to the service request by the service; and
   sending the response to the parent transaction coordinator by the service without generating the subordinate transaction coordinator at the location machine.

8. A non-transitory computer readable storage medium including instructions that, when executed by a processing device of a local machine, cause the processing device to perform a method comprising:
   receiving, by the processing device of the local machine, a service request from a parent transaction coordinator hosted by a remote machine, the service request including a transaction context;
   caching the transaction context at the local machine;
   monitoring, by the processing device of the local machine, a service as the service performs work to comply with the service request; and
   determining, by the processing device after the service has begun performing the work, when to generate a subordinate transaction coordinator and when to register the subordinate transaction coordinator with the parent transaction coordinator based on the work performed by the monitored service.

9. The non-transitory computer readable storage medium of claim 8, the method further comprising:
   generating the subordinate transaction coordinator at the local machine and registering the service with the subordinate transaction coordinator when the service performs transactional work.

10. The non-transitory computer readable storage medium of claim 9, the method further comprising:
    if the transactional work changes a state of the service, registering the subordinate transaction coordinator with the parent transaction coordinator using the transaction context.

11. The non-transitory computer readable storage medium of claim 10, wherein the service performs transactional work, the method further comprising:
    generating a service response to the service request by the service;
    attaching information for registering the subordinate transaction coordinator with the parent transaction coordinator to the service response; and
    sending the service response to the parent transaction coordinator, wherein the parent transaction coordinator to use the attached information to register the subordinate transaction coordinator with the parent transaction coordinator.

12. The non-transitory computer readable storage medium of claim 9, wherein the service performs transactional work that fails to change a state of the service, the method further comprising:
    generating a service response to the service request by the service;
    sending the service response to the parent transaction coordinator by the subordinate transaction coordinator; and
    terminating the subordinate transaction coordinator prior to an initiation of a commit protocol by the parent transaction coordinator.

13. The non-transitory computer readable storage medium of claim 12, wherein the transactional work performed by the service does not change a state of the service, the method further comprising:
    generating a read-only response to a prepare message prior to the prepare message being generated by the parent transaction coordinator; and
    attaching the read-only response to the service response, wherein the parent transaction coordinator to use the read-only response during a commit phase of a two-phase commit protocol without sending the prepare message to the subordinate transaction coordinator.

14. The non-transitory computer readable storage medium of claim 8, wherein the service does not perform transactional work, the method further comprising:
    generating a response to the service request by the service; and
    sending the response to the parent transaction coordinator by the service without generating the subordinate transaction coordinator at the location machine.

15. An apparatus comprising:
    a memory; and
    a processing device coupled to the memory, wherein the processing device is configured to:
    execute a transaction dispatcher, the transaction dispatcher to receive a service request from a parent transaction coordinator, to remove a transaction context from the service request, to cache the transaction context, and to forward the service request to a service;
    execute the service, the service to perform work to satisfy the service request; and
    execute a manager, the manager to monitor the service as the service performs the work, and to determine, after the service has begun performing the work, when to generate a subordinate transaction coordinator and when to register the subordinate transaction coordinator with the parent transaction coordinator based on the work performed by the monitored service.

16. The apparatus of claim 15, further comprising:
    the manager to cause the processing device to execute the subordinate transaction coordinator and to register the service with the subordinate transaction coordinator when the service performs transactional work.

17. The apparatus of claim 16, further comprising:
    the subordinate transaction coordinator to register with the parent transaction coordinator if the transactional work changes a state of the service.

18. The apparatus of claim 17, wherein the service performs transactional work, the apparatus further comprising:
    the service to generate a service response to the service request; and
    the subordinate transaction coordinator to attach information for registering the subordinate transaction coordinator with the parent transaction coordinator to the service response, and to send the service response to the parent transaction coordinator.

19. The apparatus of claim 16, wherein the service performs transactional work that fails to change a state of the service, the apparatus further comprising:
    the service to generate a service response to the service request;
    the subordinate transaction coordinator to send the service response to the parent transaction coordinator; and
    the manager to terminate the subordinate transaction coordinator prior to an initiation of a commit protocol by the parent transaction coordinator.

20. The apparatus of claim 15, wherein the service does not perform transactional work, the apparatus further comprising:
    the service to generate a response to the service request and to send the response to the parent transaction coordinator without generating the subordinate transaction coordinator at the apparatus.

* * * * *